United States Patent [19]

Goldstein et al.

[11] Patent Number: 5,190,833
[45] Date of Patent: Mar. 2, 1993

[54] ELECTRODES FOR METAL/AIR BATTERIES AND FUEL CELLS AND BIPOLAR METAL/AIR BATTERIES INCORPORATING THE SAME

[75] Inventors: Jonathan Goldstein; Neal Naimer, both of Jerusalem; Erik Khasin, Rishon Le-Zion; Avner Brokman, Jerusalem, all of Israel

[73] Assignee: Luz Electric Fuel Israel Ltd., Jerusalem, Israel

[21] Appl. No.: 633,518

[22] Filed: Dec. 31, 1990

[51] Int. Cl.$^5$ .................................... H01M 8/06
[52] U.S. Cl. ............................ 429/27; 429/41; 429/42; 429/210
[58] Field of Search ................ 429/27, 41, 42, 210

[56] References Cited

U.S. PATENT DOCUMENTS

| | | | |
|---|---|---|---|
| 4,842,963 | 6/1989 | Ross, Jr. ................... | 429/21 |
| 4,950,561 | 8/1990 | Niksa et al. ............. | 429/27 |
| 4,957,826 | 9/1990 | Cheiky ..................... | 429/27 |
| 5,006,424 | 4/1991 | Evans et al. ............. | 429/15 |

Primary Examiner—Karl Group
Assistant Examiner—Chris Gallo
Attorney, Agent, or Firm—Fleit, Jacobson, Cohn, Price, Holman & Stern

[57] ABSTRACT

The invention provides an electrode for use in a primary metal/air battery or in a hydrogen-oxygen fuel cell comprising a current-collecting metallic structure and a metallic foamed or fiber mat having a first surface attached to a first surface of the structure, a second surface of the mat being impregnated with an inner hydrophobic waterproof barrier layer coated with an outer active catalytic layer.

20 Claims, 4 Drawing Sheets

ELECTRODES FOR METAL/AIR BATTERIES AND FUEL CELLS AND BIPOLAR METAL/AIR BATTERIES INCORPORATING THE SAME

The present invention relates to electrodes for metal/air batteries and fuel cells, as well as to bipolar metal/air batteries incorporating the same.

Metal/air batteries of monopolar and bipolar design, both rechargeable and primary, as well as electrodes therefor, are known in the art as described, e.g., in U.S. Pat. Nos. 3,549,422; 4,246,324; 4,341,847; 4,463,064; 4,565,749; 4,585,710; 4,877,694; 4,908,281; 4,925,744 and 4,957,826.

As is known and described, e.g., in U.S. Pat. No. 4,908,281, metal/air batteries produce electricity by the electrochemical coupling of a reactive metallic anode to an air cathode through a suitable electrolyte in a cell. The air cathode is typically a sheet-like member, having opposite surfaces respectively exposed to the atmosphere and to the aqueous electrolyte of the cell. During cell operation oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added oxygen-reduction catalyst) in association with a finely divided hydrophobic polymeric material and incorporating a metal screen as the conductive element. A variety of anode metals have been used or proposed; among them, zinc, iron, lithium, aluminum, or alloys thereof are considered especially advantageous for particular applications, owing to their low cost, light weight, and ability to function as anodes in metal/air batteries using a variety of electrolytes.

A typical aluminum/air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface.

Aqueous electrolytes for metal/air batteries consist of two major types, namely a neutral-pH electrolyte and a highly alkaline electrolyte. The neutral-pH electrolyte usually contains halide salts and, because of its relatively low electrical conductivity and the virtual insolubility of aluminum therein, is used for relatively low power applications. The highly alkaline electrolyte usually consists of NaOH or KOH solution, and yields a higher cell voltage than the neutral electrolyte.

Furthermore, as described, e.g., in U.S. Pat. No. 4,246,324, in many cases these batteries are recharged with the electrodes in place by redepositing or partially redepositing the consumable metal on the anode by applying an external potential to the individual units or the entire energy storage system. However, such batteries in practice are never completely restored or recharged to their original state and become progressively shorter-lived and must be out of use for considerable time during recharging.

Other types of batteries are provided with anodes which are removable from and reinsertable into an enclosing cathode chamber. The anodes are usually of consumable metal, or consumable, compacted or sintered metal powder, mounted on conductive, porous metal supports or screens of various metals such as nickel, iron, copper, titanium, tantalum and alloys thereof. The removal and insertion of the anodes of such prior art batteries into the cathode chambers present problems because of shape changes in the anode structure during recharging outside the cathode chamber o envelope and because the electrolyte impregnated separators in the cathode chambers are often torn or destroyed during removal or reinsertion of the recoated anodes.

U.S. Pat. No. 4,246,324 attempts to solve this problem by providing a battery comprising an inert container, housing a plurality of hollow, box-like cathode elements and consumable metal anode elements in spaced relationship, each of said box-like cathode elements having at least one gas-permeable, porous cathode in at least one wall and at least one consumable metal anode separate from and removably supported opposite said gas-permeable, porous cathode, and cathode and anode of adjacent elements being disposed in spaced facing relationship; means to maintain an electrolyte in the spaces between the cathodes and anodes; means to feed a depolarizing gas through the interior of said box-like cathode elements to the porous cathodes; means for collecting precipitated material below said anode and cathode elements, and means to electrically connect said cathode and anode elements to an external load, said anode elements being removable and reinsertable in said container.

According to the present invention, there is now provided an electrode for use in a primary metal/air battery or in a hydrogen oxygen fuel cell comprising;
 a) a current-collecting metallic structure; and
 b) a metallic foamed or fiber mat having a first surface attached to a first surface of said structure, a second surface of said mat being impregnated with an inner hydrophobic waterproof barrier layer coated with an outer active catalytic layer.

In preferred embodiments of the present invention, there is provided a bipolar electrode for use in a primary metal/air battery of the type having a metallic slurry anode as described hereinafter, said electrode comprising;
 (a) a current-collecting electrolyte-impervious metallic structure having a first surface for collecting current from said metallic slurry anode, and
 b) a metallic foamed or fiber mat having a first surface attached to a second surface of said structure, a second surface of said mat being impregnated with an inner hydrophobic waterproof barrier layer coated with an outer active catalytic layer, said mat constituting an air cathode.

The current-collecting structure of the present invention is chemically inert, both with respect to the electrolyte and the slurry, and is preferably made of nickel or silver, or steel coated with nickel or silver, and use of a nickel foil for this purpose is especially preferred.

The term "metallic foamed or fiber mat" as used herein relates to a mat formed of foamed metal, metal fibers or metal-coated fibers, said metal being nickel or a valve metal such as titanium, tantalum, tungsten, zirconium, niobium, hafnium, vanadium, yttrium or alloys thereof with nickel being especially preferred.

Thus, preferably said mat is foamed nickel in which nickel metal forms the walls of the bubbles of the foamed structure or said mat is comprised of nickel fibers or nickel-coated fibers of a diameter of about 20 microns.

Also in the preferred embodiment of the present invention, said mat has a thickness of about 0.4 to about 2 millimeters and a porosity of at least 75%. Preferably, said mats have a porosity of at least 90%.

As stated, gas permeable porous cathodes formed of sintered particles are known, e.g., from U.S. Pat. No. 4,246,324; however, as is known, a sintered compact of particles has a limited porosity of only about 30–65%, is prone to cracking and does not have the resiliency and adaptability to pressure and expansion forces exhibited by the presently proposed metallic foamed or fiber mats. Furthermore, said patent is completely silent as to the performance characteristics of the battery proposed therein, which battery is, in fact, substantially inferior to the battery produced according to the present invention, as demonstrated in Comparative Example A hereinafter.

As will be realized, with only minor modification the bipolar electrode of the present invention can be adapted for use in a hydrogen-oxygen fuel cell.

Thus, the present invention also provides a bipolar electrode for use in a primary fuel cell battery comprising:
a) a current-collecting electrolyte-impervious metallic structure;
b) a first mat of nickel foam, nickel fibers or nickel-coated fibers having a first surface attached to a first surface of said structure, a second surface of said mat being impregnated with an inner hydrophobic waterproof barrier layer coated with an outer active catalytic layer, catalytic for oxygen reduction, said mat constituting a cathode;
c) a second mat of nickel foam, nickel fibers or nickel-coated fibers having a first surface attached to a second surface of said structure, a second surface of said mat being impregnated with an inner hydrophobic waterproof barrier layer coated with an outer active catalytic layer, catalytic for hydrogen oxidation, said mat constituting an anode.

As stated, most of the prior art patents rely on a mechanically removable solid anode with the disadvantages inherent therein.

In contradistinction to said prior art systems, the present invention provides
a bipolar primary metal/air battery of the type having a plurality of electrically series-connected cells, each cell comprising:
a) a metallic slurry anode, containing oxidizable metal particles and an alkaline electrolyte;
b) a current-collecting electrolyte-impervious metallic structure having a first surface in contact therewith for collecting current from said metallic slurry anode;
c) a metallic foamed or fiber mat having a first surface attached to a second surface of said structure, a second surface of said mat being impregnated with an inner hydrophobic waterproof barrier layer coated with an outer active catalytic layer, said mat constituting an air cathode.
d) means for introducing oxygen into said mat; and
e) a porous separator positioned adjacent to said second surface of said mat and which allows the migration of said alkaline electrolyte therethrough.

As will be realized, one advantage of the battery of the present invention is the provision of a metallic slurry anode in which the oxidizable metal component is present in the form of a hydraulically pumpable slurry with the electrolyte, whereby upon complete discharge, the spent slurry can simply be rinsed out, e.g. with alkali solution and a fresh portion of slurry introduced or pumped into the cells.

Furthermore, this metallic slurry anode can be maintained in a static bed and used in combination with a permanently affixed bipolar electrode according to the present invention.

In especially preferred batteries of the present invention, said mat is provided with an oxygen-rich electrolyte-immiscible organic fluid for supplying oxygen to said positive air electrode.

The term "oxygen-rich organic fluid" as used herein relates to any such fluid having an ability to retain at least 15% oxygen, i.e., a fluid capable of carrying at least 15 ml oxygen/100 ml fluid.

Fluids having a high affinity for oxygen and which readily facilitate the diffusion of oxygen in and out of said fluid, in an order of at least 30 ml oxygen/100 ml fluid, are especially preferred.

It is also to be noted that the term "organic fluid" as used herein includes viscous fluids which can be smeared on the cathode structure and which enable oxygen diffusion therethrough, while serving as a supplementary hydrophobic layer.

The fluid could be an oil such as a fluorinated hydrocarbon with high oxygen solubility or an oil or fluid containing a dissolved oxygen trapping compound such as a macrocyclic. Other non-halogenated oils suitable for use include silicone oils, such as Dow Corning 200; high-boiling mineral oils and hydrocarbons, such as decane, $C_{10}H_{24}$.

Especially preferred for use in the present invention are perfluorocarbon compounds, because of their especially high affinity for oxygen; however, other oxygen-rich organic fluids such as the aforementioned silicone oils, mineral oils, hydrocarbons and fluorinated hydrocarbons may alternatively be preferred for economic reasons.

The perfluorocarbon compounds are dense liquids of a low surface tension, immiscible with water and are noted for their ability to dissolve about 40% of oxygen at 37° C. and at atmospheric pressure (water dissolves only 2.3% oxygen by volume). These compounds are considered as oxygen carriers and releasing agents thus serving as temporary substitutes for blood in severe cases of hemorrhage or ischemia. The chemistry and properties of perfluoronated liquids are summarized in *Federation Proceedings*, Vol. 29, No. 5, Sept.-Oct. 1970. To the best of our knowledge no attempts have been made however to use such fluids as vehicles for delivering oxygen to a metal/air battery.

Suitable perfluorocarbon compounds for use in the present invention include perfluorotripropylamine cis- and transperfluorodecalin, perfluoroisopentyltetrahydropyrane, perfluoroN,N-dimethylcyclohexylamine, perfluoro-1-methyl decalin, perfluoroperhydrophenanthrene and perfluorotributylamine.

Preferably said perfluorocarbon compound is selected from cis-perfluorodecalin, trans-perfluorodecalin, perfluoro-1-methyl decalin, perfluorotripropylamine and perfluoro-tributylamine.

In these preferred embodiments there would also be included means for pumping the fluid through the mat constituting the air electrode.

For these embodiments mats having a porosity of at least 95% are preferred since such mats facilitate the pumping of the fluid therethrough with minimal resistance.

The presently proposed battery system is appreciably advantageous over prior art batteries, inter alia, in light of the facts that:
   a) Using a fluid of a type which is immiscible with an alkaline electrolyte, prevents the evaporation of water vapor by acting as an additional hydrophobic barrier.
   b) By pumping oil through the air electrode, the problem of thermal balance in the cells could be more easily controlled.
   c) By varying the pumping rate of oil through the air gaps in the mat, the amount of pure $O_2$ available to the air electrode current collector changes. Thus, an increased pumping rate gives increased EV battery power for acceleration.
   d) Since there are no air gaps in the stack, the battery is characterized by improved robustness.

As stated, the outer surface of said mat is impregnated with an active catalytic layer as is known, per se, in the art using a catalyst, such as the platinum group metals, including a platinum black; platinum group metal oxides; platinum activated carbon; silver (e.g., Raney silver); macrocyclics, such as cobalt macrocyclic or cobalt pthalocyanine, or other catalytic metal oxides such a perovskites, delafossites, bronzes or spinel-type oxides.

Beneath said active catalytic layer there is provided a hydrophobic waterproof barrier layer, of the type also known per se in the art using, e.g. a lipophobic (e.g. hydrophobic) resin such as PTFE, polyethylene, polychlorofluoroethylene, various vinyl resins, and the like, in such a way as to let the resin penetrate inside the pores for a certain depth from the surface. The resin forms a waterproof barrier beneath the second surface of the mat and imparts hydrophobic properties thereto, thereby effectively preventing flooding of the mat by the electrolyte and facilitating the maintenance of the three-phase boundary layer with oxygen and electrolytes in the catalytic layer along the second surface of the mat which functions as an air cathode.

When the terminology "oxygen" is used in this disclosure and claims, it is understood that a wide number of gases containing substantial portions of oxygen, such as air, are satisfactory for use with the oxygen diffusion cathodes in the cells of this invention. The only requirement is that sufficient oxygen be supplied for reduction without associated gases reacting in an adverse manner with the electrodes or electrolyte.

The electrolyte may be any suitable alkaline aqueous electrolyte such as about 4 to 12N potassium hydroxide or sodium hydroxide. In the embodiment of the invention utilizing chemically non-reactive anode surfaces, a slurry of anode-active metal particles is maintained in a static bed during use and hydraullically replaced after discharge. Suitable anode-active metal particles include zinc particles having a size in the order of 50–500 microns present in an amount by weight of zinc in the electrolyte, of about 30 to 70 percent of the weight of the electrolyte.

In operation, the zinc from the anode active zinc particle slurry is converted to zincates which are removed from the electrochemical cell in the electrolyte.

The invention will now be described in connection with certain preferred embodiments with reference to the following illustrative examples and attached figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

The figures will be referred to in conjunction with the following examples to facilitate a better understanding of the invention.

EXAMPLE 1

Figure 1:
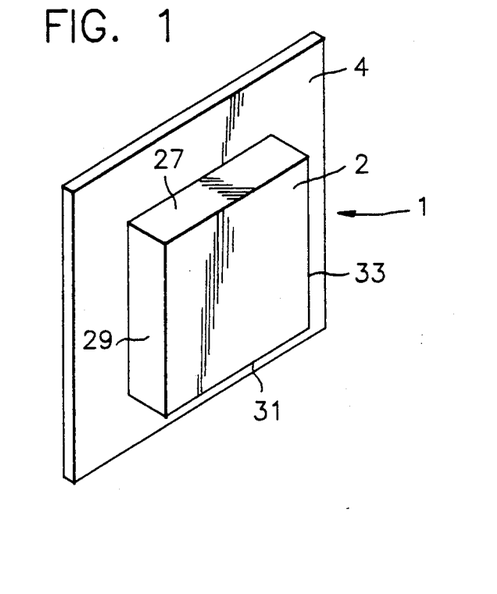
FIG. 1 is a perspective view of an electrode according to the present invention.
Figure 1A:
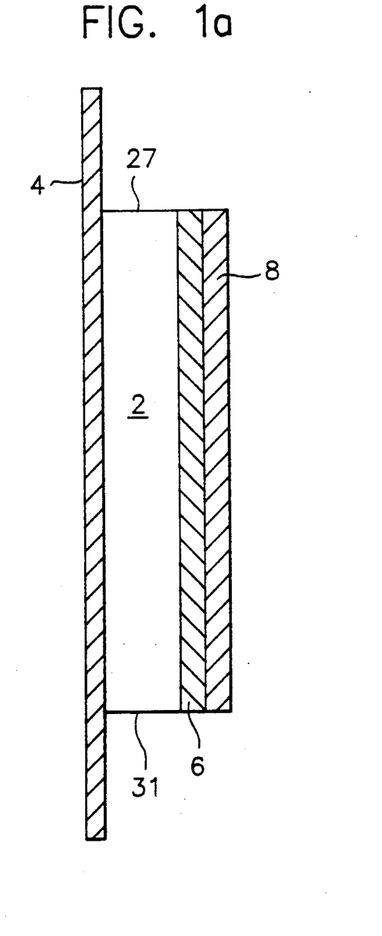
FIG. 1a is a cross-sectional view of the electrode of FIG. 1.

A piece of nickel mat 2 of a size of 71×71 mm, 2 mm thick and with a porosity of 90%, based on nickel fibers of a diameter of approximately 20 microns, was spot-welded at several points to a nickel foil 4 of a size of 79×79 mm, 0.2 mm thick, so that the foil projected beyond the mat by about 4 mm on each side (see FIG. 1). To an approximate depth of 0.5 mm, the outer surface of the mat was made both active for oxygen reduction and hydrophobic to electrolyte penetration by first pressing into the mat an inner layer 6 of 10 mg/cm$^2$, PTFE-bonded carbon as a blocking layer, as seen in FIG. 1a, followed by a mixture of PTFE powder and Raney silver catalyst (24 mg/cm$^2$, weight ratio PTFE to silver 1:5) as active layer 8. Pressing was conducted at room temperature in a mold at a pressure of 300 kg/cm$^2$.

Following pressing, the electrode was sintered in an oven (340° C., 30 minutes).

The electrode 1 described above can be used as a basic bipolar electrode for a zinc-air battery, with the impregnated mat side functioning as the air cathode in each cell, and the nickel foil side functioning as the current collector for a metallic slurry anode adjacent thereto. For initial testing, the bipolar electrode was glued into a flat mounting plate 10 of the type illustrated in FIG. 2.

Figure 2:
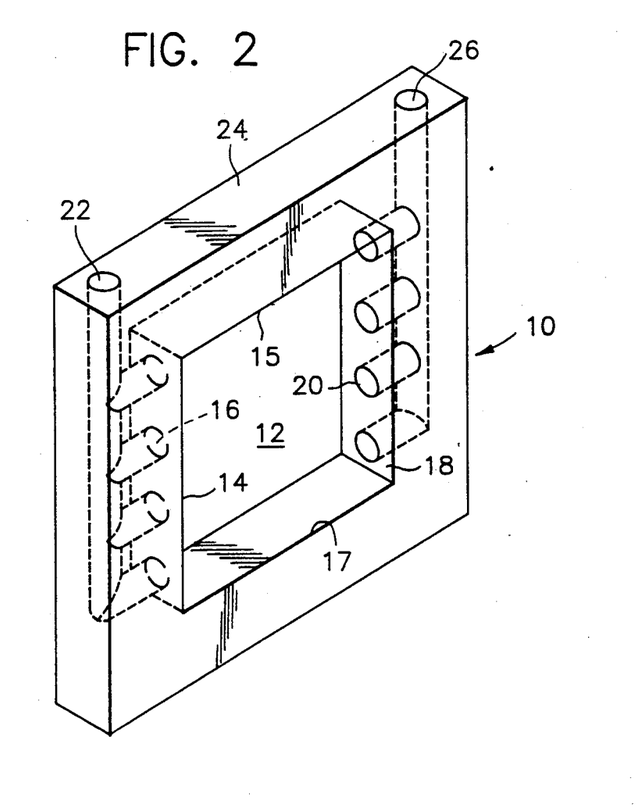
FIG. 2 is a perspective view of a supporting frame element for the electrode of FIG. 1.

Said mounting plate 10 is formed or molded preferably as one piece from a material of construction which is non-reactive with chemicals present in the battery cell. Useful materials of construction include ceramics, as well as plastics including polyvinyl chloride, nylon, polypropylene and polyphenylene oxide blends with polystyrene, and combinations of the foregoing.

Especially preferred is a mounting plate made of PVC having a central cut-out area 12 sized to tightly fit around said mat 2 as described hereinafter.

A first edge 14 of said cut-out area 12 is provided with a plurality of gas inlets 16 and the opposite edge 18 is provided with a plurality of gas outlets 20.

Gas inlets 16 are connected to and fed by a gas inlet manifold 22 bored through the plane of said plate and leading to an edge 24 thereof and gas outlets 20 are similarly connected to a gas outlet manifold 26 also bored through the plane of said plate and leading to the edge 24 thereof.

Thus, as seen in FIG. 2, there is provided a PVC sheet of a size of 100 mm × 100 mm, 2 mm thick, having a central cut-out window 12 to accommodate the nickel mat 2 and a number of air inlet holes 16 and exit holes 20 drilled within the plane of the sheet, so that air could be supplied to and removed from the inner surface of the mat. The mat is inserted in said cut-out area 12 with the peripheral edges 27, 29, 31 and 33 being glued to the inner surfaces 14, 15, 17 and 18 of the cut-out area 12 of said mounting plate 10, e.g., with epoxy glue which seals said edges and prevents any leakage of electrolyte into the ma 2 therefrom. A separator (not shown) can then be glued to the electrolyte-facing surface of said mat 2 and plate 10.

Figure 3:
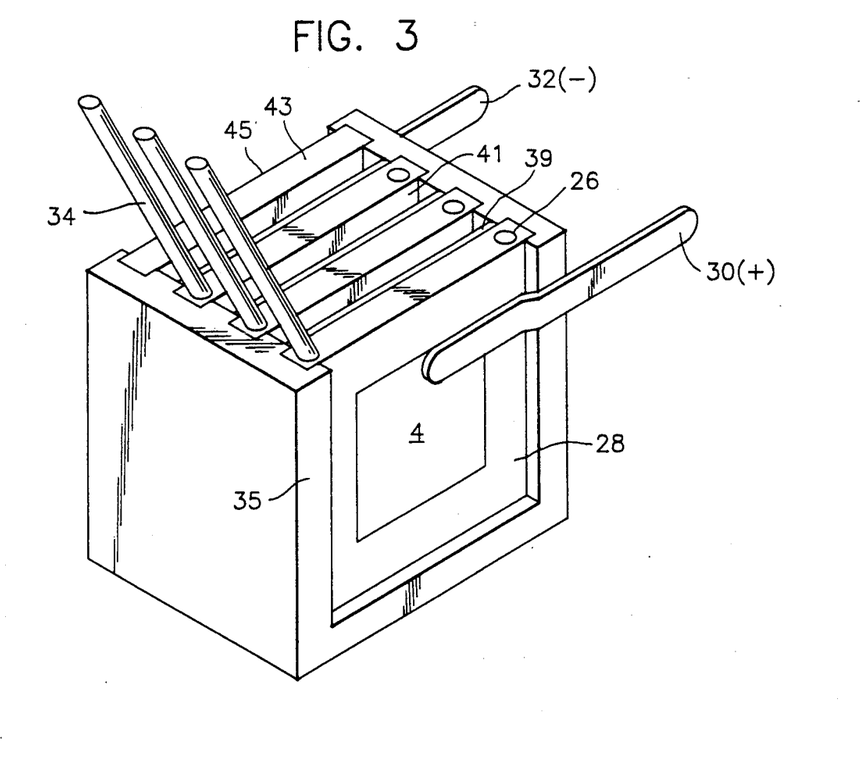
FIG. 3 is a perspective view of an assembled battery of the present invention in which the electrode of FIGS. 1 and 1a is arranged as a bipolar electrode.
Figure 4:
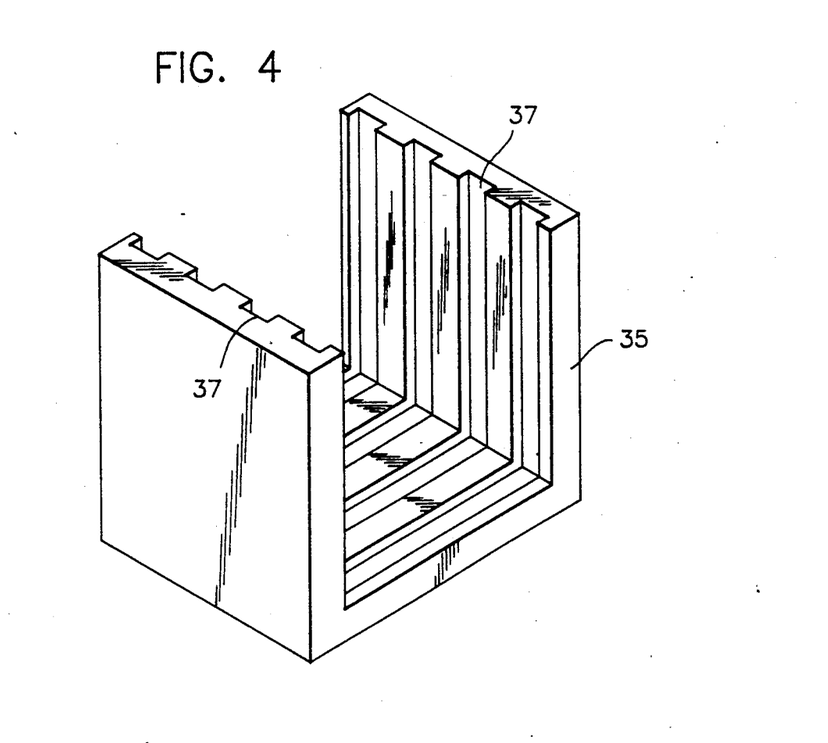
FIG. 4 is a perspective view of a battery container in which supported bipolar electrodes are insertable and removable.

A three-cell bipolar battery was constructed as shown in FIG. 3 by glueing three of the PVC-mounted bipolar electrodes 1 of FIG. 1 and a fourth plate-mounted electrode 43 comprising a PVC sheet and a nickel foil only (no mat) into a U-shaped PVC element 35, having walls of a thickness of 4 mm and provided with grooves 37 sized to receive and retain said plates 10 (see FIG. 4). Care was taken to ensure that in each cell the positive air electrode side faced the negative zinc current collector side of an adjacent electrode and that the separation 41 between the polyamide separator surface 39 and the nickel foil was about 3 mm. The first plate-mounted electrode 28 in FIG. 3 (positive) was tabbed externally with a welded-on piece of nickel foil 30 of a size of 100 mm × 10 mm × 0.2 mm as shown, to form the positive pole of the three-cell battery, while the fourth plate-mounted electrode 43 in the battery (negative), having a cut-out window but no through-going holes leading thereto, and having only a metal foil glued to the outward facing surface 45 thereof across said window with said nickel foil (not shown), was fitted with a similar welded-on nickel tab 32 to form the negative pole. The battery was first leak-tested (overnight stand with potassium hydroxide solution). Air could be supplied to the air input holes of the PVC sheets via rubber tubing 34 from a small aquarium pump.

The interior of each mat 2 communicates by means of an inlet manifold 22 and outlet manifold 26 respectively with a supply line (not shown) and an exhaust line (also not shown) for the cathode depolarizing gas (e.g. air, oxygen or other depolarizing gas) which is circulated inside each mat under superatmospheric pressure, preferably slightly in excess of the pressure of the electrolyte on the outside of the air cathode. During discharge of electricity from the battery, the depolarizing gas such as oxygen or oxygen-containing gas is contacted with the active layer 6 inside the mat 12 which is also in contact with the electrolyte passing through a porous polyamide separator 39. The gas pressure applied is adjusted to the pressure of the electrolyte, so that the electrolyte does not flood the pores of the cathode elements and gas does not blow through into the electrolyte.

To activate the battery, a zinc slurry, comprising 49.5% wt % zinc powder (50–500 micron diameter particles amalgamated with 4 wt % mercury), 50 wt % as potassium hydroxide solution of specific gravity 1.4, and 0.5 wt % of gelling agent (polyacrylic acid), was poured into the space 41 between the separator 39 and the nickel foil in each cell so as to cover the nickel mat and separator. Approximately 30 cc of slurry containing about 30 g zinc was introduced into each cell, and following wet-in, the air pump was switched on. The open current voltage of the battery was about 4.35 V with approximately equal voltages of 1.45 V/cell indicating the system was free from short circuits. The system was then discharged at a current of 1.5 A (30 mA/cm$^2$ at the air electrode) and ran for 10 hours until a 3 V cut-off voltage providing an average discharge voltage of 3.6 V (1.2 V/cell). The battery thus delivered 15 Ah at 3.6 V (54 Wh), and since the total weight of the battery was 300 grams (see weight breakdown and dimensions in Table 1), the energy density was 180 Wh/kg (245 Wh/liter) at this (10-hour) discharge rate, with zinc utilization about 60%.

The reaction of the battery could be represented by the following formulas:

at the cathode: $\frac{1}{2}O_2 + H_2O + 2e \rightarrow 2OH$ at the anode: $Zn + 2OH^- \rightarrow ZnO + H_2O + 2e$ total reaction: $Zn + \frac{1}{2} O_2 \rightarrow ZnO$ The battery had excellent power characteristics, and even after 5 hours discharge, it could still deliver a peak power of 10 A at 2.7 V (200 mA/cm$^2$ peak current at the air electrodes). Following complete discharge, the spent slurry was rinsed out with alkali and a fresh portion of slurry poured into the cells. A discharge performance similar to that of the first cycle was obtained. The compact and robust structure of this bipolar zinc-air battery was noted.

TABLE 1

Weight Breakdown in gm for 3 Cell Bipolar Zinc-Air Battery
(3.6V, 15Ah) - Dimensions approx. 110 × 105 × 19 mm.

| | |
|---|---|
| Zinc slurry | 180 |
| Nickel Foil and Mats | 30 |
| Air electrode Blocking and Active Layers | 5 |
| Plastic Housing | 60 |
| Glue and Separators | 25 |
| | 300 |

EXAMPLE 2

A bipolar battery was constructed as in Example 1 but a nickel foam of similar dimensions and porosity to the nickel mat was used as a matrix for the air electrode active and blocking layers in the bipolar air electrode, in place of the nickel mat. The bipolar battery with the foam matrix air electrode performed substantially as in Example 1.

EXAMPLE 3

A bipolar zinc-air battery was constructed as in Example 1 with a nickel mat based air electrode, but instead of supplying oxygen to the air electrode via a gaseous phase (piped air), oxygen was supplied in dissolved form via an organic liquid. An organic liquid was chosen with an appreciably higher solubility for oxygen than aqueous solutions, also with inertness and immiscibility with respect to the alkaline electrolyte of the battery, and with low vapour pressure, and the oil perfluorodecalin was found to be acceptable. A 50 ml portion of oil was maintained saturated with oxygen by continuous bubbling through of air from an aquarium pump. The oxygen-rich oil was then circulated through the mat portion of the three air electrode elements of the bipolar battery, using a peristaltic pump, at a rate of 10 cc/min and returned for resaturation with oxygen. The bipolar battery with the oil layer supplying oxygen to the cathodes performed substantially as in Example 1. However, allowing 100 gm for the total oil weight reduced the energy density by about one third, compared with Example 1 (without considering weight of pumps).

COMPARATIVE EXAMPLE A

A three-cell bipolar battery was constructed as in Example 1, but instead of using nickel mat as the air electrode substrate, a plaque of sintered nickel as described in U.S. Pat. No. 4,246,324 was substituted for the nickel mat during construction of each of the bipolar electrodes. It had a porosity of 50%, equivalent dimensions to the mat, and was similarly impregnated with a surface layer of active and blocking layers.

As in the case of the bipolar plates with a nickel mat, each sintered plaque was also spot-welded at several points to the nickel foil backing plate. The bipolar battery was then operated with zinc slurry as the negative plate active material and with an air-saturated perfluorodecalin oil as oxygen carrier to the positive air electrodes (just as in Example 3). Due, however, to the lower porosity of the nickel plaque compared with nickel mat, a lower oil flow rate (1 cc/min) had to be used.

The battery gave a substantially similar discharge performance to that of Example 3 as regards steady discharge at 30 mA/cm$^2$, but a reduced peak power of only 5 A at 2.7 V (100 mA/cm$^2$ peak current at the air electrode). This indicated the advantages of the more open internal structure of a mat according to the present invention as compared to a sintered plaque.

More specifically, the batteries of the present invention are substantially superior for uses requiring high pulse capability such as for electric vehicles, since they can deliver about twice as much peak power capability as the batteries according to the prior art.

EXAMPLE 4

Figure 5:
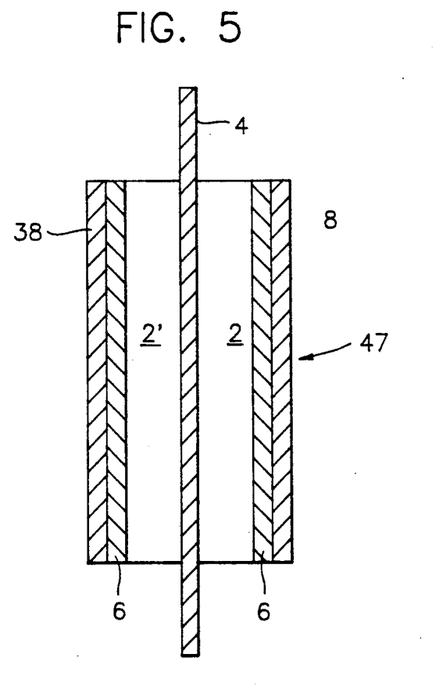
FIG. 5 is a cross-sectional view of a bipolar electrode according to the present invention for use in a hydrogen-oxygen fuel cell.

Referring now to FIG. 5 there is shown in cross section a basic bipolar element 47 for the battery comprised of a nickel foil 4 as in Example 1, but with a nickel fiber mat 2,2' of the type and dimensions of Example 1 welded to both sides. For each bipolar element 47, the mat 2 on one side was made catalytic for oxygen reduction by impregnation with a silver-based active layer 8 and an inner blocking layer 6 as described in Example 1. The mat 2' on the other side was made catalytic for hydrogen oxidation by impregnating it with an active layer 38 of platinum catalyzed carbon (5 wt %).

Figure 6:
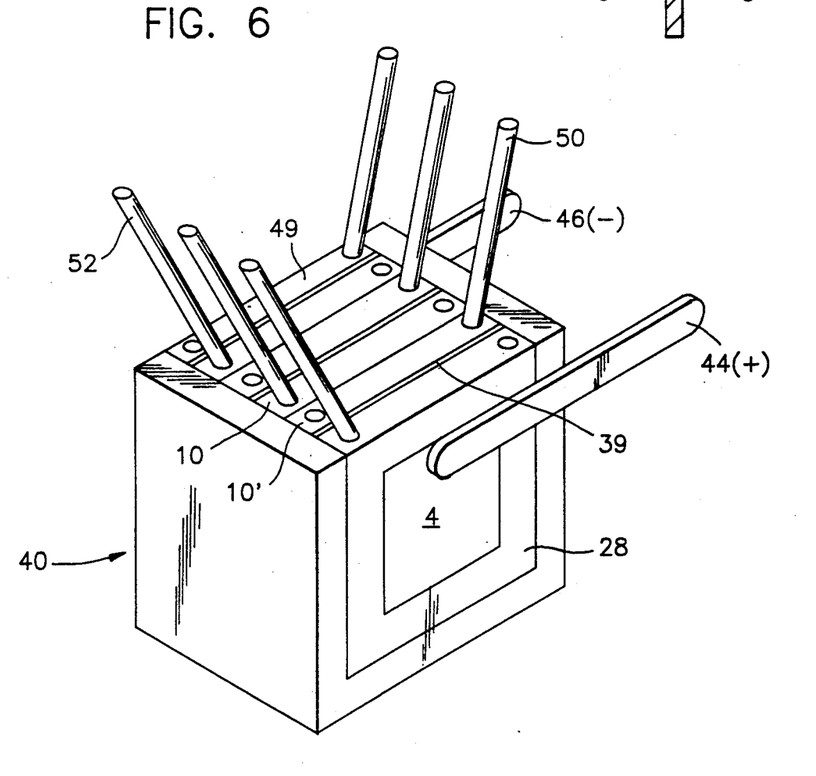
FIG. 6 is a perspective view of an assembled bipolar hydrogenoxygen fuel cell battery.

Bipolar elements 47 as shown in FIG. 5 are then glued to a pair of mounting plates 10, 10' as shown in FIG. 2 to form the central electrodes for a bipolar hydrogen oxygen fuel cell battery 40 as shown in FIG. 6.

A three-cell bipolar battery 40 was constructed as shown in FIG. 6 with two such central electrodes and two endplates 28 and 49, which endplates in fact function as monopolar electrodes.

The first mounted endplate 28 was tabbed externally with a welded-on piece of nickel foil 44 of dimensions 100 mm × 10 mm × 0.2 mm attached to nickel foil 4 which in turn was attached to an inner mat only (not seen) which is catalytic to oxygen reduction and which formed the positive terminal of the battery.

The other endplate 49 was tabbed externally with a welded on piece of nickel foil 46 attached to a nickel foil (not shown) and carrying one inner mat catalytic to hydrogen oxidation and serving as the negative terminal of the battery.

In each cell the negative hydrogen electrode mat 2' faced the positive oxygen electrode mat 2. The separation between the mats, approximately 1 mm, was filled using a porous polyamide separator 39. The PVC sheets enclosing the respective mat surfaces allowed supply of bottled hydrogen to the negatives, and bottled oxygen to the positives via hydrogen supply tubes 50 and oxygen supply tubes 52, respectively.

The battery was activated by wetting in the separators with potassium hydroxide solution of a specific gravity of 1.3, and supplying oxygen and hydrogen to the respective electrodes. The open circuit voltage of the battery was 3.15 V (1.05 V/cell). A current of 10 A (200 mA/cm$^2$) could be drawn at a potential of 2.4 V, showing the good power delivery of this fuel cell battery.

EXAMPLE 5

Figure 7:
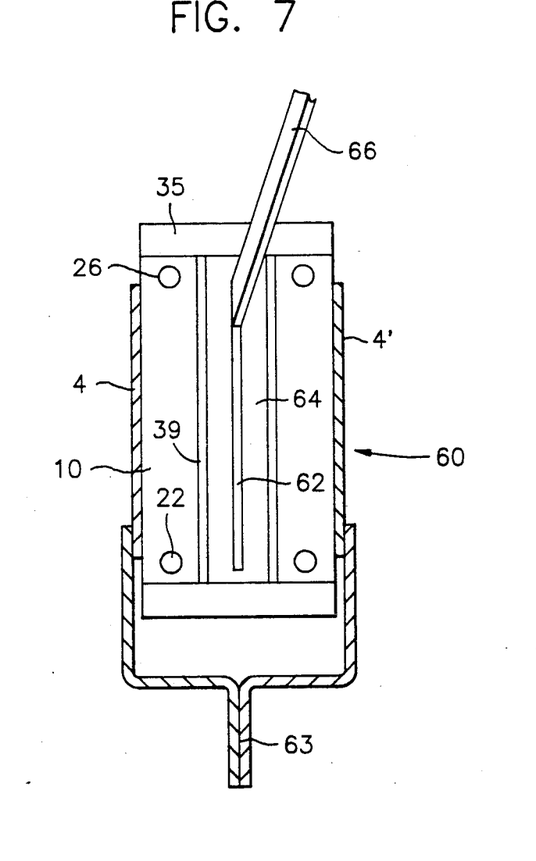
FIG. 7 is a top view of a metal-air cell incorporating two monopolar electrodes of the present invention.

It will be realized that the electrode 1 of the present invention and the mounting plate 10 therefor as shown in FIGS. 1, 1a and 2 can also be arranged as monopolar electrodes by simply forming a cell 60 from two electrodes 1 facing one another as shown in FIG. 7, wherein the outwardly facing current collecting structure 4 of each mat serves merely for collecting the positive current generated in air-cathode mat 2 and a separate replaceable zinc anode 62 is immersed in the electrolyte maintained in the space 64 between two mats 2 facing one another.

Thus a monopolar electrode 1 for a zinc-air cell 60 was constructed as follows:
1. A piece of nickel mat 2 (71×71 mm, 2 mm thick and with 90% porosity), based on nickel fibers of approximately 20 microns diameter, was spot-welded flush at several points to a nickel foil 4, 79×79 mm and 0.2 mm thick. The foil projected beyond mesh by about 4 mm on each side as seen in FIG. 1.
2. To an approximate depth of 0.5 mm, the outer surface of the mat was made both active for oxygen reduction and hydrophobic to electrolyte penetration. An inner layer 6 of 10 mg/cm$^2$ PTFE-bonded carbon was pressed into the mat as a blocking layer (air side). It was followed by an active outer layer 8 (electrolyte side). This outer layer was a mixture of PTFE powder and Raney silver catalyst (24 mg/cm$^2$. Weight ratio of PTFE to silver was 1:5).
3. Pressing was conducted at room temperature in a mold at a pressure of 300 kg/cm$^2$. Following pressing, the electrode was sintered in an oven at 350° C. for 30 minutes.

For initial testing, the foil-backed mat was glued into a PVC mounting plate 10 of a size of 100×100 mm, 2 mm thick. It had a window 12 cut out to accommodate the nickel mat, and a number of air inlet 16 and exit 20 holes drilled within the plane of the mounting plate (see FIG. 2). These holes allowed air to be supplied to and removed from the inner surface of the mat, respectively, via inlet manifold 22 and exit manifold 26. A porous polyamide separator 39 of a size of 79×79 mm, 0.25 mm thick, was glued to the inner facing surface of the mounting plate 10 completely covering mats 2.

The zinc-air cell 60 itself was constructed by using the U-shaped PVC battery container 35 of FIG. 4 and gluing two electrodes of the present invention into two adjacent grooves 37 thereof so that the mats 2 faced each other, defining a space 64 therebetween for electrolyte and the zinc anode 62.

The electrodes 1, 1' were glued parallel to one another and about 3 mm apart. The two nickel foils 4, 4' external to the battery were tabbed with a welded-on piece of nickel foil 63 and formed the positive pole of the cell. Air was supplied to the air inlet manifold 22 of the PVC mounting plates through rubber tubing (now shown), using a small aquarium pump.

The air electrodes were first evaluated by filling the cell with about 30 ml of potassium hydroxide solution (specific gravity of 1.3). A solid anode of zinc foil 62, of a size 71×71×0.2 mm, was then inserted into the electrolyte. At one end, a portion of foil, 66 10 mm wide and 100 mm long extended out of the cell and acted as the negative pole.

Following activation of the air pump, the cell gave an open circuit voltage of 1.45 V. When the cell was discharged at a steady current of 1 A (10 mA/cm$^2$ at the air electrodes), the discharge voltage was 1.2 V. Following one hour of discharge, the zinc anode was heavily corroded. After replacing the anode and electrolyte, the discharge was repeated with equivalent results.

EXAMPLE 6

A zinc-air cell was demonstrated using a monopolar nickel mat-based air electrode and zinc slurry negative electrode.

The present example used a cell similar to that of Example 5, but replaced the plain electrolyte and zinc foil 62 with 30 ml of zinc slurry. The zinc slurry was composed of zinc powder, 49.5 wt % (50–500 micron diameter particles amalgamated with mercury of 4 wt %); 50 wt % as potassium hydroxide solution, with specific gravity of 1.4; and a gelling agent (polyacrylic acid), 0.5 wt %.

The gap between the separators covering the air electrode was then filled with this slurry. A nickel foil of a size of 71×71×0.2 mm, with a welded-on tab (100×10×0.2 mm) was introduced into the middle of the slurry. It acted as an anode current collector and negative pole of the cell (FIG. 3).

Following activation of the air pump, the cell gave an open circuit voltage of 1.45 V. The cell was then discharged at a current of 1.5 A (30 mA/cm$^2$ at the air electrode). It ran for 10 hours down to a 1 V cutoff voltage, providing an average discharge voltage of 1.2 V. The cell thus delivered 15 Ah. Since there was about 30 gm of zinc in the slurry, zinc utilization was about 60%.

The cell had good power characteristics. After 5 hours of discharge, it delivered a peak current of 10 A at 0.9 V (200 mA/cm$^2$ peak current density at the air electrode).

Following complete discharge, the spent slurry was rinsed out with alkali and a fresh portion of slurry was introduced into the cell. A discharge performance similar to the first cycle was obtained.

EXAMPLE 7

Figure 8:
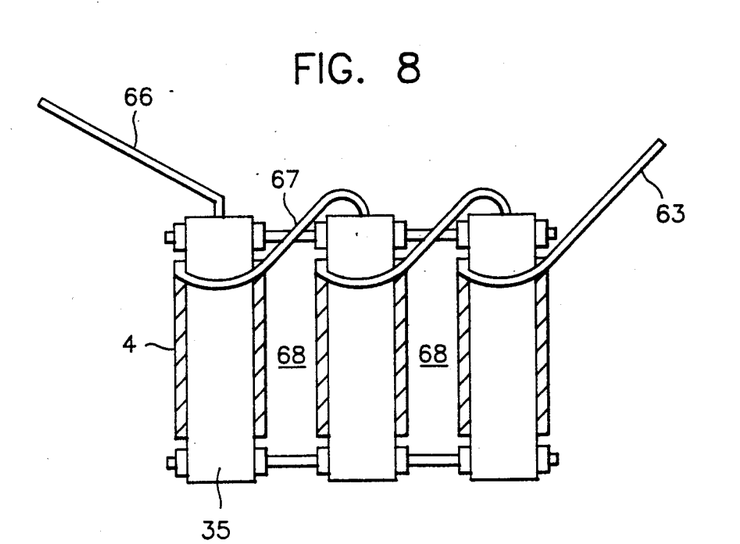
FIG. 8 is a perspective view of an assembled battery incorporating three monopolar cells of FIG. 7.

Referring now to FIG. 8, there is shown a three-cell zinc-air battery constructed by placing three cells from Example 6 side by side. They were connected together using steel tie bolts and spacing washers which pass through the plastic walls of the cells. They were connected electrically in series by means of jumpers 67 leading from foils 4 of a first cell 60 to the anode 62 of an adjacent cell. The cells are connected with an air space 68 of approximately 4 mm between cells. A tab 66 leads to the negative terminal (not shown) of the battery while a tab 63 leads to the positive terminal (not shown) of the battery.

When the three cells were filled with 30 ml each of zinc slurry, the open circuit voltage was 4.35 V. On discharge at 1.5 A, the battery ran for 10 hours at an average voltage of 3.6 V until a cutoff voltage of 3 V.

Following complete discharge, the spent slurry was washed out of the cells using alkali and fresh slurry was introduced into each cell. A battery discharge performance similar to that of the first cycle was observed.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A bipolar primary metal/air battery of the type having a plurality of electrically series-connected cells, each cell comprising:
    a) a metallic slurry anode, containing oxidizable metal particles and an alkaline electrolyte;
    b) a current-collecting electrolyte-impervious metallic structure having a first surface in contact therewith for collecting current from said metallic slurry anode;
    c) a metallic foamed or fiber mat having a first surface attached to a second surface of said structure, a second surface of said mat being impregnated with an inner hydrophobic waterproof barrier layer coated with an outer active catalytic layer, said mat constituting an air cathode;
    d) means for introducing oxygen into said mat, and
    e) a porous separator positioned adjacent to said second surface of said mat and which allows the migration of said alkaline electrolyte therethrough.

2. A bipolar primary battery as claimed in claim 1, wherein said mat is foamed nickel in which nickel metal forms the walls of the bubbles of the foamed structure.

3. A bipolar primary metal/air battery as claimed in claim 1, wherein said mat is comprised of nickel fibers or nickel-coated fibers of a diameter of about 20 microns.

4. A bipolar primary metal/air battery as claimed in claim 1, wherein said mat comprises a valve metal.

5. A bipolar primary metal/air battery as claimed in claim 1, wherein said mat has a thickness of about 0.4 to about 2 millimeters.

6. A bipolar primary metal/air battery as claimed in claim 1, wherein said mat has a porosity of at least 75%.

7. A bipolar primary metal/air battery as claimed in claim 1, wherein said mat has a porosity of at least 90%.

8. A bipolar primary metal/air battery as claimed in claim 1, wherein said structure is nickel, silver, or silver or nickel-plated steel.

9. A bipolar primary metal/air battery as claimed in claim 1, wherein said structure is a nickel foil.

10. A bipolar primary metal/air battery as claimed in claim 1, wherein said mat is provided with an oxygen-rich electrolyte-immiscible organic fluid for supplying oxygen to said positive air electrode.

11. A bipolar primary metal/air battery as claimed in claim 10, wherein said fluid is a perfluorocarbon.

12. A bipolar primary metal/air battery as claimed in claim 10, wherein said fluid is selected from the group consisting of silicone oils, mineral oils, hydrocarbons and fluorinated hydrocarbons having an ability to carry at least 15 ml oxygen per 100 ml fluid.

13. A bipolar primary metal/air battery as claimed in claim 1, wherein said oxidizable metal particles are selected from the group consisting of zinc, iron, lithium, aluminum, and alloys thereof.

14. A bipolar primary metal/air battery as claimed in claim 1, wherein said oxidizable metal particles are zinc.

15. A bipolar primary metal/air battery as claimed in claim 1, wherein said metallic slurry anode is maintained in a static bed in said cells.

16. A bipolar primary metal/air battery of the type having a plurality of electrically series-connected cells, each cell comprising:
   a) a static bed metallic slurry anode, containing oxidizable metal particles and an alkaline electrolyte;
   b) a current-collecting electrolyte-impervious metallic structure having a first surface in contact therewith for collecting current from said metallic slurry anode;
   c) a mat of nickel foam, nickel fibers or nickel coated fibers having a first surface attached to a second surface of said structure, a second surface of said mat being impregnated with an inner hydrophobic waterproof barrier layer coated with an outer active catalytic layer, said mat constituting an air cathode.
   d) means for introducing oxygen into said mat; and
   e) a porous separator positioned adjacent to said second surface of said mat and which allows the migration of said alkaline electrolyte therethrough.

17. An electrode for use in a primary metal/air battery or in a hydrogen-oxygen fuel cell comprising;
   a) current-collecting metallic structure; and
   b) a metallic foamed or fiber mat having a first surface attached to a first surface of said structure, a second surface of said mat being impregnated with an inner hydrophobic waterproof barrier layer coated with an outer active catalytic layer.

18. A bipolar electrode for use in a primary metal/air battery of the type having a metallic slurry anode, said electrode comprising:
   a) a current-collecting electrolyte-impervious metallic structure having a first surface for collecting current from said metallic slurry anode; and
   b) a metallic foamed or fiber mat having a first surface attached to a second surface of said structure, a second surface of said mat being impregnated with an inner hydrophobic waterproof barrier layer coated with an outer active catalytic layer, said mat constituting an air cathode.

19. A bipolar electrode for use in a primary metal/air battery of the type having a metallic slurry anode, said electrode comprising:
   a) a current-collecting electrolyte-impervious metallic structure having a first surface for collecting current from said metallic slurry anode; and
   b) a mat of nickel foam, nickel fibers or nickel-coated fibers having a first surface attached to a second surface of said structure, a second surface of said mat being impregnated with an inner hydrophobic waterproof barrier layer coated with an outer active catalytic layer, said mat constituting an air cathode.

20. A bipolar electrode for use in a primary fuel cell battery comprising:
   a) a current-collecting electrolyte-impervious metallic structure;
   b) a first mat of nickel foam, nickel fibers or nickel-coated fibers having a first surface attached to a first surface of said structure, a second surface of said mat being impregnated with an inner hydrophobic waterproof barrier layer coated with an outer active catalytic layer, catalytic for oxygen reduction, said mat constituting a cathode.
   c) a second mat of nickel foam, nickel fibers or nickel-coated fibers having a first surface attached to a second surface of said structure, a second surface of said mat being impregnated with an inner hydrophobic waterproof barrier layer coated with an outer active catalytic layer, catalytic for hydrogen oxidation, said mat constituting an anode.

* * * * *